United States Patent
Alstrom

(10) Patent No.: US 10,901,378 B2
(45) Date of Patent: Jan. 26, 2021

(54) PROCESS CONTROL METHOD

(71) Applicant: Core A/S, Frederiksberg C (DK)

(72) Inventor: Preben Alstrom, Frederiksberg C (DK)

(73) Assignee: Core A/S, Frederiksberg C. (DK)

( * ) Notice: Subject to any disclaimer, the term of this patent is extended or adjusted under 35 U.S.C. 154(b) by 236 days.

(21) Appl. No.: 14/892,766

(22) PCT Filed: May 15, 2014

(86) PCT No.: PCT/DK2014/000028
§ 371 (c)(1),
(2) Date: Nov. 20, 2015

(87) PCT Pub. No.: WO2014/190993
PCT Pub. Date: Dec. 4, 2014

(65) Prior Publication Data
US 2016/0091873 A1 Mar. 31, 2016

(30) Foreign Application Priority Data
May 28, 2013 (DK) .................................. 2013 00323

(51) Int. Cl.
G05B 13/04 (2006.01)
(52) U.S. Cl.
CPC .......... *G05B 13/048* (2013.01); *G05B 13/042* (2013.01)
(58) Field of Classification Search
CPC ............................ G05B 13/048; G05B 13/042
USPC .......................................................... 700/29
See application file for complete search history.

(56) References Cited

U.S. PATENT DOCUMENTS

| | | | | |
|---|---|---|---|---|
| 5,402,367 A * | 3/1995 | Sullivan | ............. | G03F 7/70516 702/85 |
| 6,216,048 B1 * | 4/2001 | Keeler | ................. | G05B 13/027 700/29 |
| 6,546,295 B1 * | 4/2003 | Pyotsia | ................ | G05B 13/024 318/561 |
| 6,684,115 B1 * | 1/2004 | Cheng | .................. | G05B 13/024 700/45 |
| 8,738,269 B2 * | 5/2014 | Yasui | ................... | G05B 13/048 123/339.2 |

(Continued)

FOREIGN PATENT DOCUMENTS

WO 94/25933 A1 11/1994
WO WO 9425933 A1 * 11/1994 ........... G05B 13/027

OTHER PUBLICATIONS

Modeling and Predictive Control Using Hybrid Intelligent Techniques for a Nonlinear Multivariable Process. Instrumentation Science & Technology, vol. 39, No. 2, Mar./Apr. 2011, pp. 211-230 (Year: 2011).*

*Primary Examiner* — Kenneth M Lo
*Assistant Examiner* — Mohammed Shafayet
(74) *Attorney, Agent, or Firm* — Jones Robb, PLLC

(57) ABSTRACT

The invention relates to method for controlling a process, the method comprising an adaptive control model and at least one process input and at least one process output, the control model comprising predicting the relevant targets in the process; and selecting the relevant drivers for the process based on the target prediction, where the method preferably comprises adapting a number of parameters based on one or more inputs, and using the adapted parameters as an input for the target prediction.

7 Claims, 2 Drawing Sheets

(56) References Cited

U.S. PATENT DOCUMENTS

| | | | | |
|---|---|---|---|---|
| 8,849,438 B2* | 9/2014 | Parikh | G05B 19/41875 | 700/110 |
| 2003/0171829 A1* | 9/2003 | Fisher | G05B 13/024 | 700/28 |
| 2004/0049299 A1* | 3/2004 | Wojsznis | G05B 11/32 | 700/29 |
| 2004/0133531 A1* | 7/2004 | Chen | G06K 9/6298 | 706/8 |
| 2005/0137721 A1* | 6/2005 | Attarwala | G05B 13/048 | 700/30 |
| 2005/0154476 A1* | 7/2005 | Gallestey | G05B 13/042 | 700/30 |
| 2005/0234688 A1* | 10/2005 | Pinto | G05B 17/02 | 703/6 |
| 2005/0267606 A1* | 12/2005 | Bartlett, Jr. | G05B 13/042 | 700/29 |
| 2006/0195409 A1* | 8/2006 | Sabe | G05B 13/0265 | 706/16 |
| 2007/0078529 A1* | 4/2007 | Thiele | G05B 13/048 | 700/29 |
| 2007/0168057 A1* | 7/2007 | Blevins | G05B 13/022 | 700/53 |
| 2007/0260346 A1* | 11/2007 | Ganesan | G05B 11/42 | 700/108 |
| 2008/0021571 A1* | 1/2008 | Kokotov | G05B 11/32 | 700/1 |
| 2008/0077257 A1* | 3/2008 | Peterson | G05B 13/048 | 700/34 |
| 2009/0143872 A1* | 6/2009 | Thiele | G05B 13/048 | 700/30 |
| 2010/0082120 A1 | 4/2010 | Stephenson | | |
| 2010/0228363 A1* | 9/2010 | Denison | G05B 13/048 | 700/11 |
| 2012/0221124 A1* | 8/2012 | Thiele | G05B 13/042 | 700/31 |
| 2013/0041482 A1* | 2/2013 | Badwe | G05B 13/048 | 700/29 |
| 2014/0128998 A1* | 5/2014 | Sayyarrodsari | G05B 13/042 | 700/37 |
| 2014/0228979 A1* | 8/2014 | Caldwell | G05B 13/048 | 700/29 |

* cited by examiner

PROCESS CONTROL METHOD

FIELD OF THE INVENTION

The present invention relates to the area of process control. More specifically the invention relates to the area of process control where a product or product components remains under certain process conditions for a relatively long time in order to arrive at a desired end product.

BACKGROUND OF THE INVENTION

Numerous books and articles are published in the area of process control. Most of the known methodologies in the area of process control consist of models receiving input from the process they are controlling and based on that input calculating output that regulate the relevant parameters of the process.

In a process for manufacturing a product, e.g. a food product, the process parameters along which the process is controlled will have a significant impact on composition of the final product. For a producer of a product this may mean that the profit varies greatly with the final product and hence the control of the process as close to the optimal process as possible is of very significant importance. Worst case the product, when variation from the desired state of the final product is to significant, the product may have to be discarded, which may mean a significant loss to the producer.

In order to deal with the control of the process in a more predictable manner various attempts have been made where different models and control strategies have been combined.

From U.S. Pat. No. 7,856,281 a process controller is known, which based on process inputs generates outputs and comprises a model, which may be non-linear, and which generates prediction signals for the outputs. Further a correction unit may be provided for correcting a prediction vector to compensate for the non-linearities of the process.

From U.S. Pat. No. 7,317,953 a process controller is known, having a multivariable process model characterized as a set of two or more SISO models. The adaptation system detects changes in process inputs and may initiate an adaptation cycle, where the adaptation system determines a subset of SISO models that need to be adapted. After adaptation the adaptation is verified by determining whether the adapted multivariable process has a lower modeling error than the current model, and if the error is lower the adapted model is used.

WO 2011/014350 A1 relates to process control systems and, more particularly, to online, self-configured, model-based adaptive predictive process controllers for multi-zone systems, capable of regulating temperature, humidity, pressure, flow rates, and the like, that may be used in various process control application in industries. The invention of WO 2011/014350 A1 comprises determining system parameters of each controlled zone (for example a temperature zone) and the correlation between these parameters continuously during heating and cooling phases and by using the information acquired to maintain individual set point temperatures on each zone of the temperature controlled system.

Although these previously known process controls provide some improvements to the process predictability, the significant differences that may occur in relation to the input material fed into the process still may cause the process parameters to deviate from the desired and hence the final product deviate from the desired condition as well.

Hence, an improved method would be advantageous, and in particular a more efficient and/or reliable process control would be advantageous.

SUMMARY OF THE INVENTION

Accordingly, the invention preferably seeks to mitigate, alleviate or eliminate one or more of the above mentioned disadvantages singly or in any combination.

The object of the present invention can be achieved by a method having the features defined in claim 1, by a control system as defined in claim 10 and by a production apparatus as defined in claim 11. Preferred embodiments are defined in the dependent claims and explained in the following description and illustrated in the accompanying drawings.

In particular, it may be seen as an object of the present invention to provide a method for process control that by solving one or more of the above mentioned shortcommings will provide an improvement in relation to the output from the process.

This object and several other objects are obtained in a first aspect of the invention by providing a method for controlling a process, the method comprising an adaptive control model and at least one process input and at least one process output, the control model comprising:

predicting the relevant targets in the process, characterized in that
the relevant drivers for the process being selected based on said target prediction.

In one embodiment the method comprises adapting a number of parameters based on one or more inputs, and using the adapted parameters as an input for the target prediction.

In one embodiment the method comprises measuring an offline parameter and providing the offline parameter measurement as an input for the parameter selection.

Preferably the method comprises a preprocessing unit for preparing the input signals for the adaptation process.

Preferably the method comprises manipulated input variables, dependent output variables, non-manipulated input variables and/or performance goal and measures.

Advantageously the method comprises non-linear parameter adaptation, target prediction, target tuning, driver tuning and driver selection as input to the process to be controlled.

Advantageously the manipulated input variables and the dependent output variables are used for the non-linear parameter adaptation and further for the target prediction together with the output from the non-linear parameter adaptation.

Preferably the non-manipulated input variables and performance goal and measures are used for the target tuning.

Preferably the method comprises measuring an offline parameter and providing the offline parameter measurement as an input for the target tuning.

Preferably the target prediction and the target tuning is used for the driver tuning.

The invention is particularly, but not exclusively, advantageous for obtaining a more predictable outcome of the process that is controlled.

In a further aspect of the invention a control system is foreseen which is adapted to perform the method according to the present invention in relation to a production apparatus.

In a still further aspect of the invention a production apparatus is provided comprising a control system exercising a method according to present invention.

Preferably the production apparatus comprises measurement devices for measuring manipulated data in the process as well as non-manipulated data in and/or around the process and where the data are fed to the control system.

In the above text various terminology relating to the generic control system have been used. The following explanation is meant to provide clarification for the terminology, while at the same time it should not be interpreted as limiting for the scope of the invention.

Drivers: Input (e.g. the velocity of a conveyor screw or the opening of a valve), that may be adjusted (manipulated) and which affects the target values. The process does not always deliver data about the drivers.

Targets: Outputs, which are measured, and which are used as targets that are controlled close to a set point by means of drivers.

Other (non-adjustable) input: Measurements, which are not targets, but may be used for adjusting targets (set points). This may be both on-line as well as off-line measurements. By off-line measurements is meant e.g. lab measurements that are only performed with a low frequency, e.g. every hour. Among these are often the quality measurements (performance measurements), which are the primary objectives of the optimization.

The first and second aspect of the present invention may each be combined with any of the other aspects. These and other aspects of the invention will be apparent from and elucidated with reference to the embodiments described hereinafter.

DESCRIPTION OF THE DRAWINGS

The present invention will now be explained, by way of example only, with reference to the accompanying Figures, where.

DETAILED DESCRIPTION OF AN EMBODIMENT

Figure 1:
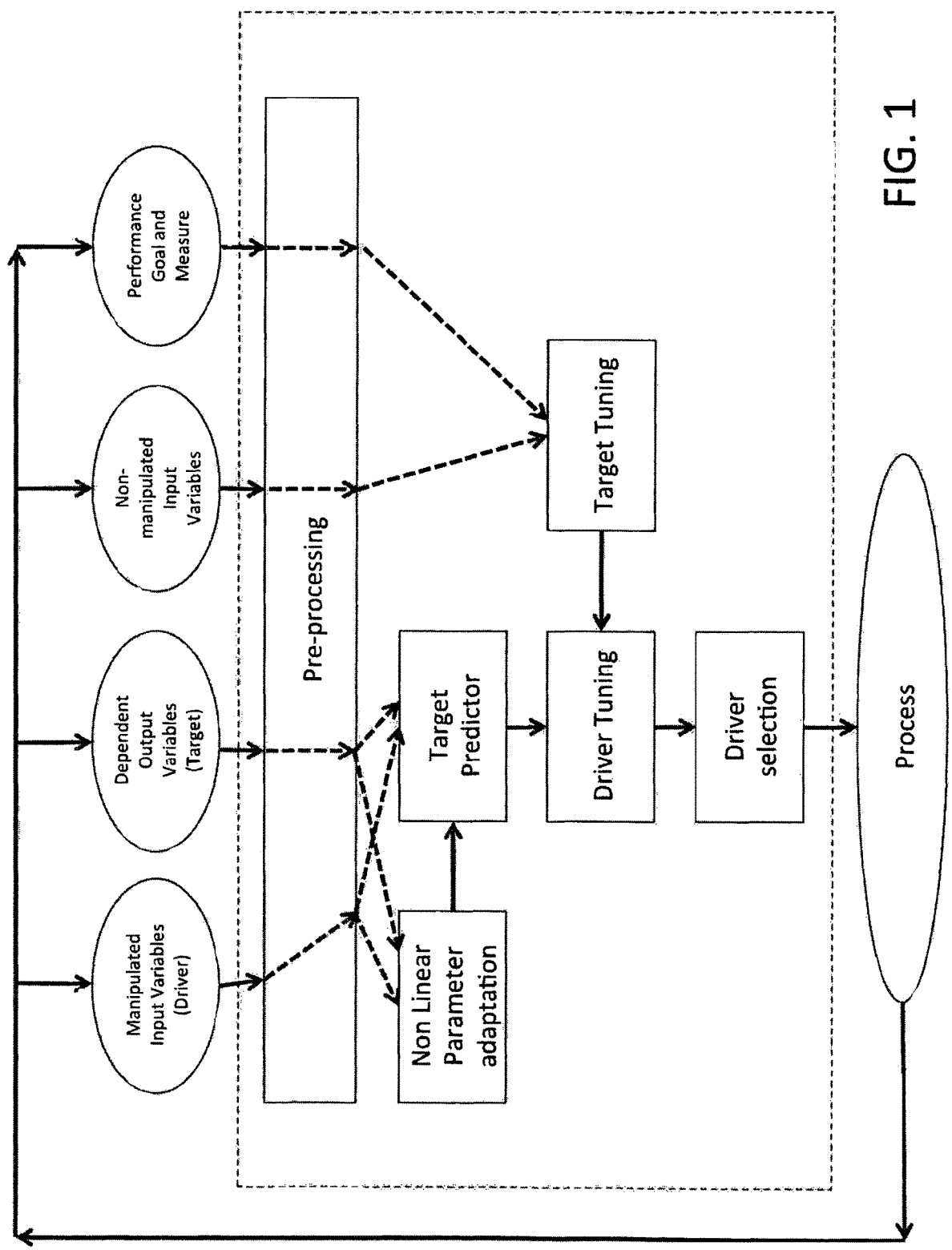
FIG. 1 is a flow-chart of a method according to the invention.

Description of Adaptive Process Control with reference to FIG. 1.

Process Data

Process data is subdivided the following way:

Manipulated input variables: These are the process variables that can be directly altered by the control. (Drives).

Dependent output variables: Theses are process variables that cannot be altered directly. (Targets). These process variables are known to be correlated with the performance measure.

Non-manipulated input variables: These are process input variables that are known to influence the performance, but can not be controlled.

Performance measure and goal: The performance goal is the desired performance value of the process. This variable cannot in general be measured on-line, i.e. continuously, instead it is measured off-line, i.e. sampled periodically (the performance measure).

Other variables: The process can contain other input or output variables that are omitted from the model and control. (Not shown on figure).

Pre-Processing

The pre-processing module performs a filtering of process data signals. This is generally done in order to remove high frequency fluctuations (noise) in the process data.

Nonlinear Parameter Adaptation

This module performs a continuous on-line adaptation of the process parameters that are used in the Target predictor module. In the response model, the parameters are the response amplitudes and timescale. Amplitude parameters are adapted based on mean values. A nonlinear adaptation of timescales is performed using correlations. Parameter adaptation is advantageous as a mean to maintain a good system model when process conditions change significantly during operation.

Target Predictor

The Target Predictor module utilizes the system model to predict the effect of drive variations on the targets. The target predictor is necessary in order to establish a strong estimate for the future variation of targets.

Driver Tuning

The Driver tuning module uses the predicted target value and current target set point to calculate possible tuning options for the drives. The driver tuning module is the controller part that steer the targets towards the desired set points.

Target Tuning

In order to achieve the performance goal, the Target tuning module adjusts the Target set points according to changes in non-manipulated variables and differences in measured performance from the performance goal. The target tuning guides the process towards the overall performance goal.

Driver Selection

The Driver selection module performs a selection from the calculated possible driver tunings based on a prioritizing scheme. Driver selection is industrially important, since it enables optimization of the overall process with regards to production capacity, energy efficiency or similar considerations.

REALIZATION OF THE INVENTION

Process Data:

Manipulated input variables (drives): E.g. the feed flow and the ingoing energy to a spray dryer (ingoing air flow and air temperatures), or the differential rotational speed of the decanter conveyor.

Dependent output variables (targets): E.g. the outgoing air and powder temperatures in the spray dryer or the conveyor torque in the decanter.

Non-manipulated input variables: E.g. on-line measures of outside air humidity and air temperature going into the spray dryer, on-line measures of vibration signals from the decanter, or the off-line dry matter content of the feed material in either example.

Performance measure and goal: E.g. residual moisture or dry matter content in either example. If and only if the performance is measured on-line, the performance circle 18 is redundant (then included in circle 14).

Preprocessing

Each process variable that is part of the system model is pre-processed before it is used.

In one realization of the invention, the pre-processing is implemented with low-pass filters with an exponentially weighted moving average:

$$y_i = a_p x_i + (1-a_p) y_{i-1}$$

where:

$y_i$ is the filtered process variable at time i, $x_i$ is the raw process variable value at time i, and $a_p$ is the smoothing factor, $0 \leq a_p \leq 1$.

Non-Linear Parameter Adaptation

The continuous adaptation of system parameters is divided in two parts; parameters concerning amplitudes and parameters concerning times associated with the target response a change in a drive leads to. The inventive approach to parameter adaptation is different from any other known methods and ensures a very stable process control.

Both sets of parameters are calculated for each drive/target pair that exists in a given deployment of the control system. So given e.g. 3 drives and 2 targets, a total of 6 sets of system parameters are calculated.

Amplitude Adaptation

In one realization of the invention, the response amplitude parameters are continuously adjusted based on average drive and target values.

$$X_{T,D} = R_{T,D}^p \cdot f\left(\frac{\overline{D}}{D_{typ}}, \frac{\overline{T}}{T_{typ}}\right)$$

$$R_{T,D}(t) = R_{T,D}(t-1) \cdot (1 - a_r) + X_{T,D} \cdot a_r$$

Here t is the (integer) time step $R_{T,D}(t)$ is the adjusted response amplitude between target T, and drive D.

$R^p_{T,D}$ is the response amplitude scale.

$X_{T,D}$ is the current response amplitude between drive D and target T.

$a_r$ is the smoothing "memory" factor for adjustments of the response parameter. $0 \leq a_r \leq 1$.

$\overline{D}$ is the (filtered) measurement of the drive.

$D_{typ}$ is the typical value of the drive during normal operation.

$\overline{T}$ is the (filtered) measurement of the target.

$T_{typ}$ is the typical value of the target during normal operation.

f(x,y) is the amplitude adaptation function. The simplest scaling form of amplitude adaptation used is f(x,y)=y/x.

Time Adaptation

In one realization of the invention, the system response time is estimated using cross-correlation between the drive and target.

$$C_{T,D}^i(t) = (\overline{T}_l(t) - \overline{T}_s(t)) \cdot \left(\overline{D}_s\left(t - i \cdot \frac{\tau_{cor}}{\tau_c}\right) - \overline{D}_l(t)\right)$$

$$K_{T,D}^i(t) = (1 - a_s) K_{T,D}^i(t-1) + a_s \cdot C_{T,D}^i(t), \text{ for each } i \in [0, \ldots, N].$$

Let m(t) be the index i where $K_{T,D}^i(t)$ is smallest (most negative), then $$S_{T,D}(t) = \frac{\varphi}{\tau_{cor}} \cdot m(t)$$

Where $C_{T,D}^i(t)$ is a measure of the correlation between target T and drive D, i correlation time steps ago.

$\overline{T}_l(t)$ is the long time scale average value of the target.

$\overline{T}_s(t)$ is the short time scale average value of the target.

$\overline{D}_l(t)$ is the long time scale average value of the drive.

$\overline{D}_s(t)$ is the short time scale average value of the drive.

$\tau_c$ is the duration between control steps.

$\tau_{cor}$ is the duration between members of the correlation vector.

$K_{T,D}^i(t)$ is the vector of all i cross correlations used in the parameter adaptation.

$a_s$ is the smoothing factor for adjustments of the cross correlation vector.

N the number of elements in the cross correlation vector.

φ is a phase change parameter of order 1.

$S_{T,D}(t)$ is the adjusted response time.

Splitting the time scales between control time and the response correlation time enables implementations of the invention to make a simple trade-off (by adjusting N) between more exact response time and computation requirements in places where these are limited. However, it must always be ensured that N·$\tau_{cor}$ is longer than the longest expected characteristic time scale of the process.

Heuristic Response Module

In another implementation, requiring even less computation time and storage, the response amplitudes and time scale are adjusted together using heuristic methods. As a special case, they can be held constant, based on values derived from process analysis.

In the heuristic response case, $R_{T,D}(t)$ and $S_{T,D}(t)$ are automatically changed in response to process variations. Examples being drive values moving too close to operational limits, or a target (which is supposed to be roughly constant) changes more than a given amount. Furthermore, the limits can be dynamically adjusted in response to the control being too aggressive.

The combination of the automatic parameter changes, and automatic limit changes makes the control self-tuning.

In one implementation, the adjustment is done according to the following rule, run at intervals longer than the longest significant characteristic time scale of the process:

if (DTLong>KT*TLong):
Rnew=KRd*R
Snew=KSu*S

DTLong is the long time scale averaged difference between the short and long time scale average target value.

TLong is the long time scale average target value.

KT is the maximum accepted fraction of TLong that the controller accepts DTLong to reach before adjusting the control parameters.

KRd is the strength with which the R control parameter is adjusted down (d).

KSu is the strength with which the S control parameter is adjusted up (u).

I.e. in this case the process will try to get changes in target values more in control by adjusting drives stronger.

DeltaDmin=KD0*(DLong−Dmin)
DeltaDmax=KD0*(Dmax−DLong)
if (D<Dmin+DeltaDmin OR D>Dmax−DeltaDmax):
Rnew=KRu*Rnew
Snew=KSd*Snew DeltaDmin is a floating "disallowed" band around the operational limit Dmin.

DeltaDmax is a floating "disallowed" band around the operational limit Dmax.

KRu is the strength with which the R control parameter is adjusted up (u).

KSd is the strength with which the S control parameter is adjusted down (d).

DLong is the long time scale average drive value.

The control parameters are loosened if the drive is within either of the bands given by DeltaDmin/max. The bands are dynamically adjusted in order to allow the process to run drives close to the operational limits for extended periods, when process conditions require this, while still catching cases where drives are run towards operational limits quickly.

The values of R and S are always kept within limits Rmin/max and Smin/max, respectively. However, additional control performance can be obtained by adjusting these limits on a very long time scale, on the side of most active control (Rmin and Smax), i.e. allow stronger attempts to hold targets on their set points when process conditions are "easy", while allowing more target variation when conditions are "hard". Normal process controllers are forced to run at the settings for "hard" conditions at all times.

One implementation of this mode is to opportunistically strengthen control once every (long) while, either to a parameter given maximum/minimum dynamic limit or by a set percentage and then detect signs of the process controlling too hard.

if (abs(D−Dold)>KD1*DLong):
Rnew=KRu*R
Snew=KSd*S
Rmin=(1+KRu)*R/2
Smax=(1+KSd)*S/2
R=Rnew
S=Snew One sign of the process controlling too hard is shown above: A detection of a too large drive step. In this case the current control strength is instantly rolled back from the problematic level, and the dynamic limits are moved further, such that the problematic values are not hit again until at least the time between opportunistic parameter change.

In all other cases, the values of R and S are changed to the values of Rnew and Snew through a filter.

Target Predictor

For each target of the control system a prediction of needed corrections is continuously calculated. This calculation is a function of the current deviation from the target set point, as well as the effect caused by previous changes in drives.

$$\Delta_{T,D}(t) = \Delta_{T,D}(t-1) \cdot (1 - S_{T,D}) + D(t) - D(t-1)$$

$$\Delta T_p = T - T_{setpoint} - \Sigma_D R_{T,D} \cdot \Delta_{T,D}$$

Where
$\Delta_{T,D}(t)$ is a measure of previous alterations to the drive D.
$T_{setpoint}$ is the target set point.
$\Delta T_p$ is a prediction of the magnitude of changes to the target that is needed from the current control step.

Driver Tuning

For each target it is calculated how each drive should be tuned, if only that drive is used to correct predicted deviations to the target.

$$D_{prop}^T = [\alpha / R_{T,D}] \cdot \Delta T_p + D$$

Where
$D_{prop}^T$ is the proposed new value of a drive needed to correct deviations to the target T.
$\alpha$ is the strength of the control.

Once a $D_{prop}^T$ is calculated for all pairs of a target T and a drive D, the controller calculates a single tuned value for each drive. This is done by calculating a weighted sum of the $D_{prop}^T$'s for each D.

$$D_{update} = \frac{\sum w_T \cdot D_{prop}^T}{\sum w_T}$$

Where
$D_{update}$ is the single tuned drive value for each drive.
$w_T$ is the weight of target T.

The individual weight $w_T$ that each target is assigned is based on the strength of the targets correlation with the performance measure, the reliability of the target measurements or some other significant characteristic.

Target Tuning:

In order to achieve the overall performance goal of the process, on-line tuning of the control system target is performed.

Target tuning comes in two forms:

The primary cause for target tuning stems from measurements of the performance. The performance measure is the key indicator of the process; however it is a variable that generally is not sampled continuously. Rather performance measurements are taken periodically, typically laboratory values, and when deviations between the performance measurement and the performance goal are observed, the control system tunes the target set points.

The other source of target tuning stems from variations in non-manipulated input variables. These variables can be monitored and are known to influence the performance goal, however they are impossible to control in most practical applications. This could include such variables as ambient temperature or humidity, or be measures of input concentration of components.

Implementation of target tuning due to changes in non-manipulated input variables takes the following form:

$$T_{tuned}(t) = T_{tuned}(t-1) + \sum_{V_i} g_{T,Vi}(V_i(t), V_i(t-1), \ldots, V_i(t-n))$$

where
$T_{tuned}$ is the tuned target set point at time step t.
$V_i(t)$ are (filtered) non-manipulated input variables at time t.
$g_{T,Vi}$ is the tuning function associated with variable $V_I$ and target T.

The simplest form of g is the linear relationship:

$$g_{T,Vi}(V_i(t), V_i(t-1)) = K_{T,Vi}[V_i(t) - V_i(t-1)]$$

Implementation of target tuning due to deviations between the performance goal and the performance measure takes the following form:

$$T_{tuned} = T_{tuned.old} + h_{T,P}(P_{setpoint}, P(t), P(t-1), \ldots, P(t-n))$$

where
$T_{tuned}$ is the calculated new tuned target setpoint.
$T_{tuned.old}$ is the old target setpoint (before the performance measure was made).
P(t) is a measurement of the Performance at time t.
$P_{setpoint}$ is the overall system Performance Goal.
$h_{T,P}$ is the tuning function associated with the performance goal and target T.

The simplest form of h is the linear relationship:

$$h_{T,P}(P_{setpoint}, P) = K_{T,P} \cdot [P - P_{setpoint}]$$

Driver Selection:

The control system adjusts/tunes at most one drive each control interval. As potential drive tuning is calculated for all drives (see 50), a selection process is introduced to pick one from the group of available drives.

An ordering of the drives is made based upon considerations such as process capacity, energy efficiency or similar criteria. Furthermore, drive selection depends on whether the adjustment of a specific drive has positive or negative relationship between production and energy consumption. In a drying process for instance, the input temperature would have a positive relationship since higher temperature (all things equal) would allow a greater drying speed.

In one realization of a control system with 3 drives the following ordering was made:
1. Input material flow rate—due to primary focus on process throughput.
2. Input temperature—due to having higher energy efficiency than 3.
3. Input air flow rate—due to lowest energy efficiency.

All of the 3 drives have a positive production/energy consumption relationship, and therefore the selection between drives would have the following form:

Selection Order:
1. Increase Input material flow rate?
   a. YES→STOP selection—increase input material flow rate.
   b. NO→continue selection.
2. Increase Input air temperature?
   a. YES→STOP selection—increase Input air temperature.
   b. NO→continue selection.
3. Increase or decrease Input air flow rate?
   a. YES→STOP selection—increase/decrease Input air flow rate.
   b. NO→continue selection
4. Decrease Input air temperature?
   a. YES→STOP selection—decrease Input air temperature.
   b. NO→continue selection.
5. Decrease Input material flow rate?
   a. YES→STOP selection—decrease input material flow rate.
   b. NO→STOP—no changes.

Figure 2:
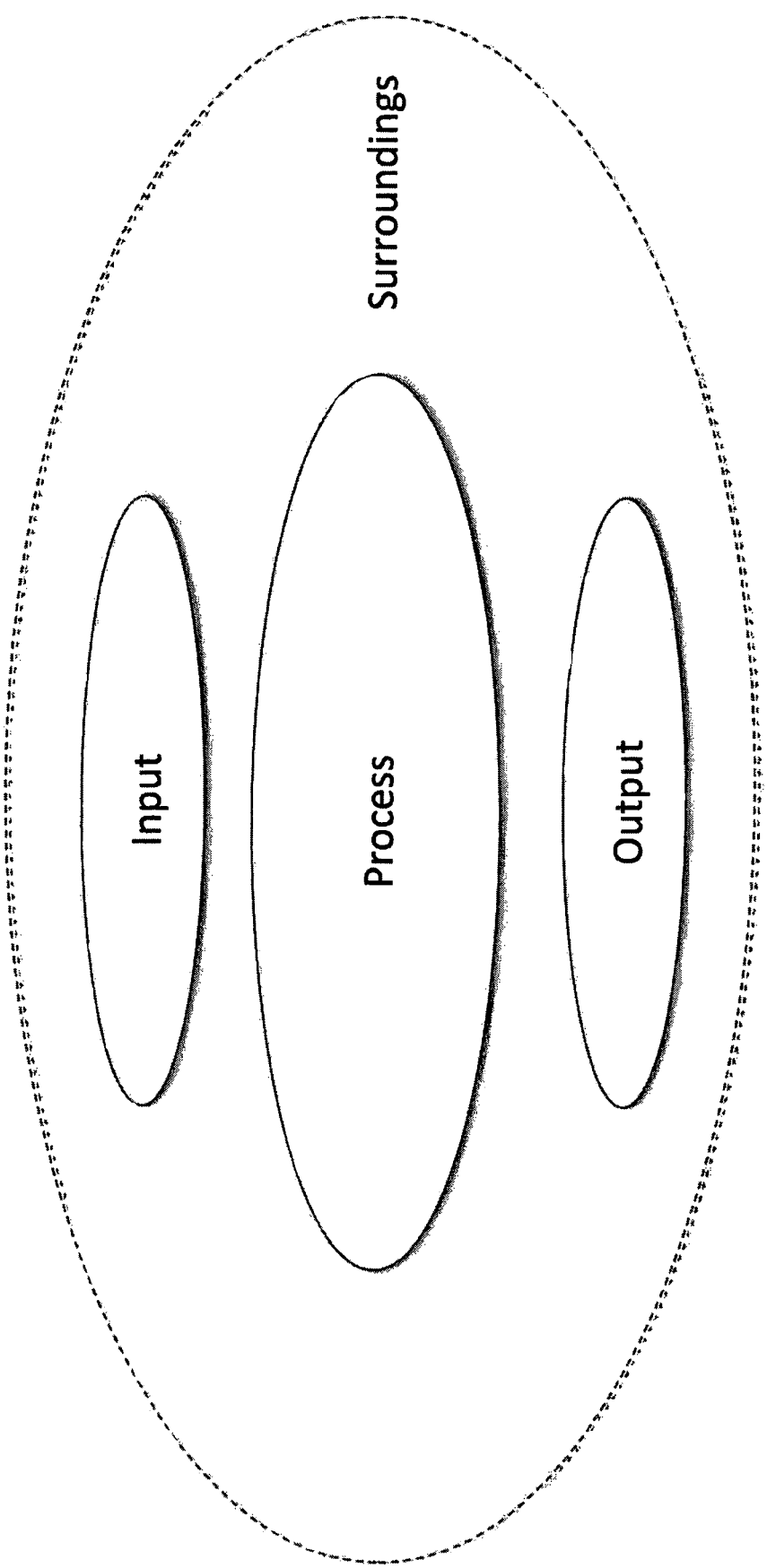
FIG. 2 is a schematic presentation of the input measurements.

In order to further emphasize the origin of the various input data for the control process reference is made to FIG. 2. Although in FIG. 1 all input data for the control process appear as originating from the process this must be understood broader than the process itself. The input data originate partly from the process, but may also be measurements of the input to the process, i.e. the feedstock for the process, or may be measurements of the output from the process, i.e. the product manufactured by the process. Finally data originating from the surroundings may also appear as input data to the process, e.g. air humidity or air pressure.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A control system for controlling a process of a production apparatus, the process having at least one process input, at least one process output, a performance goal, and measures, said performance goal being the desired performance value of said process, the control system comprising a target predicting module and a driver selection module, wherein the control system employs an online, self-tuning, adaptive control model for controlling said process of said production apparatus, said adaptive control model including:
   via said target predicting module, predicting relevant targets in the process; and
   via said driver selection module, selecting relevant drivers for the process based on a target prediction from said target predicting module;
   wherein said relevant drivers comprise adjustable inputs that affect output values of a relevant target;
   wherein the control system is configured to, while the production apparatus is in operation, non-linearly adapt a number of control model parameters based on one or more inputs to form a number of adapted control model parameters, and to input the number of adapted control model parameters to said target prediction module for said target prediction;
   wherein the control system is configured to include manipulated input variables, dependent output variables, non-manipulated input variables, and said performance goal and measures as input;
   wherein the control system is configured to, while the production apparatus is in operation, provide input to said production apparatus based on said number of adapted control model parameters, said predicted target, tuned targets for guiding the process towards the overall performance goal, tuned drivers, and selected relevant drivers; and
   wherein the control system is configured to use said manipulated input variables and said dependent output variables for the non-linear adaptation of said number of control model parameters and for said target prediction together with an output from the non-linear adaptation of said number of control model parameters.

2. A control system according to claim 1, wherein said adaptive control model uses the non-manipulated input variables and the performance goal and measures for target tuning.

3. A control system according to claim 2, wherein said control system is configured for:
   measuring an offline value; and
   inputting the offline value measurement for the target tuning.

4. A control system according to claim 2, wherein said adaptive control model uses the target prediction and the target tuning for driver tuning.

5. A control system according to claim 1, wherein said control system further comprises a preprocessing unit configured to prepare input signals prior to and for the non-linear adaptation of control system parameters.

6. A production apparatus comprising a control system according to claim 1.

7. A production apparatus according to claim 6, further comprising:
   measurement devices configured and arranged to measure manipulated data in the process and to measure non-manipulated data related to or used in the process;
   wherein the measurement devices are in communication with the control system to feed the manipulated data and non-manipulated data to the control system.

* * * * *